United States Patent Office 3,486,844
Patented Dec. 30, 1969

3,486,844
PRODUCTION OF DENSE SODA ASH
Donald C. Tabler, Bartlesville, Okla., assignor to Phillips Petroleum Company, a corporation of Delaware
Filed Dec. 29, 1967, Ser. No. 694,689
Int. Cl. C01d 7/06, 7/24
U.S. Cl. 23—63          10 Claims

ABSTRACT OF THE DISCLOSURE

Sodium carbonate monohydrate crystals having a compact, granular form are produced from an aqueous solution of sodium carbonate by performing the crystallization step in the presence of small amounts of silicate ions, sulfate ions, and a water-soluble carbohydrate gum.

---

This invention relates to a method for making sodium carbonate monohydrate from an aqueous solution of sodium carbonate. In another aspect this invention relates to a method for producing a dense soda ash of a compact, granular form from crude trona.

There are large deposits of crude trona ore containing primarily sodium sesquicarbonate $$(Na_2CO_3 \cdot NaHCO_3 \cdot 2H_2O)$$

located in the vicinity of Green River, Wyoming. Typical analysis of this crude trona is as follows:

| Constituent: | Weight percent |
|---|---|
| Sodium sesquicarbonate ($Na_2CO_3 \cdot NaHCO_3 \cdot 2H_2O$) | 92.67 |
| NaCl | 0.18 |
| $Na_2SO_4$ | 0.118 |
| $Fe_2O_4$ | 0.002 |
| Insoluble matter | 7.03 |
| | 100.00 |

There are several well known processes for producing soda ash from this ore. One commonly used process involves the steps of crushing the crude ore, calcining the crude ore to convert same to crude sodium carbonate and to burn off undesirable organic materials, dissolving the crude sodium carbonate to form an aqueous solution of sodium carbonate, settling and separating the insolubles from the solution of sodium carbonate in clarifiers, removing any remaining insolubles from the solution by filtration, evaporating a portion of the water from the sodium carbonate solution to produce sodium carbonate monohydrate crystals, separating the crystals from the solution and drying the separated crystals to produce a dense soda ash product. This process produces soda ash having a high bulk density which is desired for many applications; however, the crystals are usually in the form of thin flat plates, predominantly having a hexagonal shape. The sharp points and edges of the thin-plated crystals tend to break off and cause objectionable dusting when handled. Also, the large surface area to volume ratio of the crystals make them more difficult to purify. Further, the thin plates are difficult to separate from the solution. Various methods have been proposed to alter the crystal shape in order to eliminate these problems; however, either expensive additives and/or complicated process changes are required.

Soda ash is also produced by other commercial processes such as the well-known Solvay process. The so-called "light ash" of these processes has a relatively low bulk or apparent density, i.e. when loosely packed it has a low weight per unit volume, usually varying from 30 to 35 pounds per cubic foot, and dusts badly during handling. In order to overcome this problem one commonly used method is to hydrate the light ash with water to form crystalline monohydrate which is then dehydrated. The resultant ash has a bulk density, normally ranging from 58 to 65 pounds per cubic foot, but the particles are of widely varying shapes, being predominantly thin plates, and this product likewise dusts objectionably on handling.

I have discovered that sodium carbonate monohydrate crystals having a compact, granular form can be produced by precipitating the crystals from solution in the presence of small concentrations of soluble silicate ions, soluble sulfate ions and a water-soluble carbohydrate gum. The crystals when dehydrated provide a product which is more dust-free and has the additional advantage of being easy to separate from solution. Formation of crystals of this type is quite surprising since carbohydrate gums, commonly used as flocculating agents to increase the settling rates of the insoluble in the clarifying step of trona processes, are generally regarded as being antagonistic to crystal formation when present during crystallization. I have found that the formation of the granular crystals is apparently the synergistic effect of the combination of soluble silicate ions, soluble sulfate ions and the water-soluble carbohydrate gum. The presence of any one of these alone or the combination of two results in the formation of crystals which are even more predominantly in the form of hexagonal flat plates than when the crystallization is performed in the absence of any additives.

Accordingly, an object of this invention is to produce an improved dense soda ash having a compact, granular form and improved dusting characteristics. A further object of this invention is to provide a simple and economical method for producing sodium carbonate crystals from aqueous solutions of crude trona whereby improved crystal shape is obtained.

Other objects, aspects and advantages of this invention will become apparent to those skilled in the art from the following description, the drawings, and appended claims.

Figure 1:
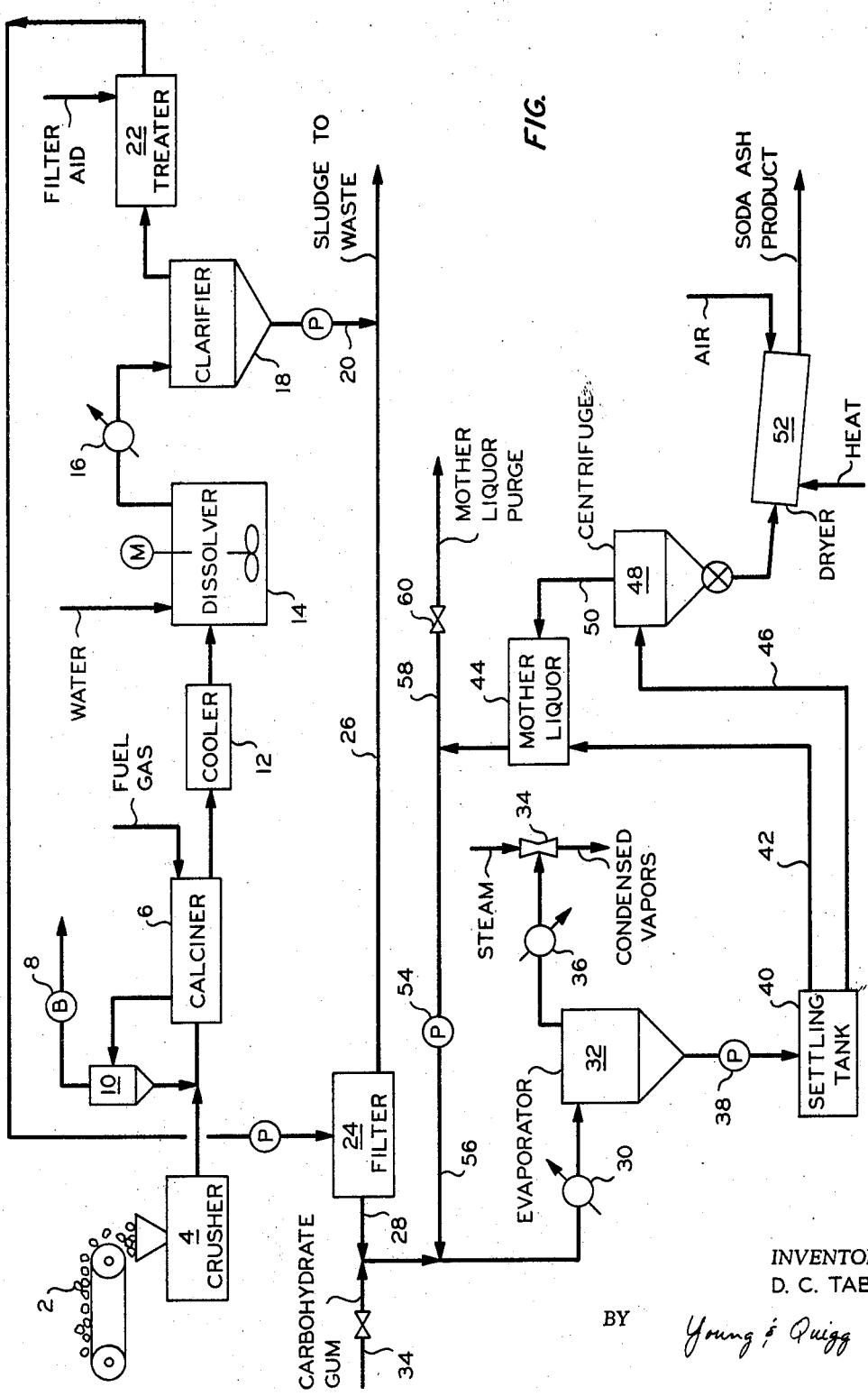
FIGURE 1 is a diagrammatic illustration of a process for the production of dense soda ash from crude trona.

According to this invention, sodium carbonate monohydrate crystals having a compact, granular form are produced from an aqueous solution of sodium carbonate containing small amounts of soluble silicate ions calculated as sodium silicate, soluble sulfate ions calculated as sodium sulfate and a water-soluble carbohydrate gum. The preferred concentration of the soluble silicate ions is in the range of 0.4 to 6.5 weight percent, more preferably about 4.5 weight percent. The preferred concentration of the soluble sulfate ions is in the range of 0.4 to 4.5 weight, more preferably about 4.5 weight percent. The preferred concentration of the water-soluble carbohydrate gum is in the range of 5 to 25 parts per million, more preferably about 10 parts per million, both based on the total weight of the solution.

When making dense ash from light ash, the formation of sodium carbonate monohydrate is performed in the presence of sodium silicate, sodium sulfate and a water-soluble carbohydrate gum which are added to an aqueous solution of the light ash.

In a process for making a dense soda ash from crude trona, the mother liquor introduced into the crystallization step will contain both soluble silicate and sulfate ions. The concentrations of soluble silicate and sulfate ions in the form of sodium silicate and sodium sulfate in the mother liquor is controlled by conventional techniques to obtain the desired ranges. The water soluble carbohydrate gum is added to the mother liquor in the process between the filtering and crystallization steps.

The amount of soluble silicate ions in the trona solution depends on several factors, but is primarily dependent on the temperatures at which the crude trona ore is calcined. At higher calcination temperatures the quantity of water soluble silicate increases. U.S. Patent 3,260,567 describes this relationship. The silicate ion concentration in the trona solution can be maintained in the desired range by controlling the calcination temperature; however, if higher calcination temperatures are required to adequately remove the organic materials in the ore, the concentration of silicate ions can be maintained in the desired range by any conventional manner, such as bleeding a portion of the mother liquor from the system.

The sulfate ion concentration in the form of sodium sulfate in the trona solution can be maintained in a desired range by bleeding a portion of the mother liquor from the process.

Concentrations of soluble silicate ions in the mother liquor above about 6.5 weight percent have been found to create solution viscosity and crystal washing problems. Concentrations of sodium sulfate making the sulfate ion concentration in the mother liquor above about 4.5 weight percent causes the formation and precipitation of an undesirable complex salt of sodium carbonate and sodium sulfate which is very difficult to separate from the product crystals. It is preferred to operate the process nearer these upper limits in order to minimize the amount of mother liquor bleed since some of the valuable sodium carbonate crystals will be lost in this bleed.

Carbohydrate gums in general are all useful in the practice of this invention, but the galactomannan and the glucomannan gums are preferred because they aid in the precipitation of the crystals when present in combination with silicate and sulfate ions, apparently because of their physical structure. These latter gums are a high molecular weight, carbohydrate polymer or polysaccharide made up of many mannose and glactose units and glucose and mannose units, respectively. The glactomannans are usually found in the endosperm of leguminous seeds such as guar, locust bean, honey locust, flame tree, *Cassia occidentalis*, and the like. The glucomannans, on the other hand, are usually found in the forms of plants of the araceae family, such as *Amorphophallus oncophyllus*, from which the product known as iles mannan is obtained, and *Amorphophallus rivieri* from which konnyaku flour is obtained.

Reference is made to FIGURE 1 which shows an exemplary process embodying this invention. The operating conditions for a process of this type are well known so will not be described in detail. For example, U.S. Patent 2,962,348 describes the operating conditions for such a process, so for the purposes of completeness the disclosure of that patent is incorporated herein by reference thereto. Crude trona 2 is conveyed to crusher 4 wherein it is crushed and screened. The crushed and screened trona ore is passed from crusher 4 to a direct-fired calciner 6. The products of combustion from calciner 6, as well as gaseous products of reaction, namely water and carbon dioxide, are drawn from the calciner by fan 8. A dust collector 10 can be interposed between a calciner and a fan.

Hot crude sodium carbonate is passed from calciner 6 to rotating cooler 12 and is cooled therein by air passing through the unit or by cooling fluid flowing through the exterior shell of the cooler. Cool trona ore is passed from cooler 12 to dissolver 14 wherein sodium carbonate and other soluble materials, such as soluble silicates and sodium sulfate, are dissolved in water or wash water containing a small amount of sodium carbonate dissolved therein and the insolubles remain suspended in the liquid. The dissolver can include a motorized agitating means to enhance and accelerate this dissolution.

The solution of sodium carbonate, soluble materials and suspended solids is passed from dissolver 14 through heat exchanger 16 to clarifier 18. Heat exchanger 16 provides sufficient heat to the solution to prevent crystallization and subsequent loss of crystals in clarifier 18. As the solution passes through clarifier 18, the insoluble materials settle out. Sludge forming at the bottom of the clarifier 18 is removed and pumped through line 20 to waste. This sludge can be further washed to recover any sodium carbonate therein. It may be necessary to add a flocculating agent to clarifier 18 to obtain the desired settling rate of the insolubles. Any well known flocculating agent, such as a water-soluble carbohydrate gum can be used. The amount of flocculating agent used is controlled so that substantially all of it is removed from the trona solution during the filtration step described hereinafter.

The clarified solution is passed from clarifier 18 to treating tank 22 wherein it is contacted with an adsorbent material, such as activated carbon, to remove soluble materials which cause adverse discoloration of the product. At this point, if there are any suspended solids remaining in the liquid, a conventional filter aid may be added.

The treated solution is then pumped from treating tank 22 through filter 24 to remove substantially all of the remaining insoluble materials. These filtered-out insolubles are removed from filter 24 and passed to waste through line 26. The filtered solution is passed from filter 24 via line 28 through heat exchanger 30, after being admixed with recycle liquor passing through line 56, to evaporator 32. An additional water-soluble carbohydrate gum, such as a gum prepared from guar seeds, is introduced via line 34 and admixed with the solution flowing through line 28. The amount of the water-soluble carbohydrate gum added through line 34 is that amount sufficient to obtain the desired concentration in the solution.

In evaporator 32 the pressure is sufficiently low to cause boiling of the heated solution, removal of water by evaporation and the formation of sodium carbonate monohydrate crystals. Vapors formed in evaporator 32 are removed therefrom by steam ejector 34 and condensed by condenser 36. Sodium carbonate monohydrate crystals and mother liquor are removed from evaporator 32 by pump 38 and the magma passed to settling tank 40. Separated mother liquor is passed from settling tank 40 to mother liquor tank 44 via line 42. The remaining magma in settling tank 40 is passed to centrifuge 48 via line 46. In centrifuge 48 any mother liquor adhering to the sodium carbonate monohydrate crystals is separated therefrom and passed via line 50 to mother liquor tank 44.

Sodium carbonate monohydrate crystals are removed from centrifuge 48 and passed to dryer 52 where free water and water of crystallization are removed to form a dense soda ash product.

Mother liquor is recycled from mother liquor tank 44 by pump 54 via line 56 to evaporator 32. A portion of the mother liquor is purged through line 58 and valve 60 to maintain the silicate ion and the sulfate ion concentrations in the desired ranges.

The following examples are presented to illustrate the apparent synergistic effect of the presence of silicate and sulfate ions in a water-soluble carbohydrate gum during the crystallization of sodium carbonate monohydrate from an aqueous solution of sodium carbonate.

EXAMPLE I

Tests demonstrating the effect of the presence of various additives in an aqueous solution of sodium carbonate on the shape of sodium carbonate monohydrate produced from the resultant solution were performed. Anhydrous sodium carbonate and water were first added to a beaker. Various additives were then admixed with the aqueous solution of sodium carbonate and the resultant solutions were heated to boiling. The boiling solutions were stirred until a crop of sodium carbonate monohydrate crystals was formed. A portion of the crystals was removed with a spatula, dried on filter paper and examined microscopically. The solutions for these tests from which the crystals were formed had the following composition:

face to volume ratio making them less susceptible to dusting when handled and easier to clarify and separate from solution.

EXAMPLE II

A run was performed at a pilot plant operating substantially as described previously to determine the effect of silicate and sulfate ions and a water-soluble carbohydrate gum on the crystal formation. A solution was prepared from calcined trona containing approximately 87 weight percent sodium carbonate. A guar gum was added to the clarifying step to aid settling and the clarified solution was filtered at about 140° F. The concentration of silicate and sulfate calculated as sodium sulfate in the feed to the evaporation step was maintained at about 1.0 weight percent. The concentration of the guar gum in the evaporator feed solution was in excess of 5 parts per million. The evaporator was operated at 140° F. for 4 hours with a mother liquor recycle flow rate of 8 gallons per minute and an average crystal production rate of 7.3 pounds per hour. The crystal retention time in the evaporator was 4.4 hours.

Figure 10:
FIGURE 10 is a photomicrograph of sodium carbonate monohydrate crystals produced from a product plant operating substantially in accordance with this invention.

The sodium carbonate monohydrate crystals produced by this pilot plant run, as illustrated in FIGURE 10, were blocky, thick, hexagonal and columnar shaped. Also the ends of the crystals were relatively square rather than being tapered like those produced by the same pilot plant when using sodium carbonate solutions without silicate and sulfate ion and a water-soluble carbohydrate gum concentration in accordance with this invention. Also, 98.5 percent of the crystals were larger than U.S. 100 mesh indicating a product less susceptible to dusting.

While this invention has been described in conjunction with presently preferred embodiments, it would be evident that it is not limited thereto.

| Constituent | 1 | 2 | 3 | 4 | 5 | 6 | 7 | 8 |
|---|---|---|---|---|---|---|---|---|
| Water, gm. | 120 | 120 | 120 | 120 | 120 | 120 | 120 | 120 |
| $Na_2CO_3$ (anhydrous), gm. | 50 | 50 | 50 | 50 | 50 | 50 | 50 | 50 |
| $Na_2SO_4$ (anhydrous), gm. | 0 | 0 | 1.5 | 1.5 | 0 | 1.5 | 0 | 1.5 |
| $Na_2SiO_3 \cdot 9H_2O$, gm. | 0 | 15 | 0 | 15 | 0 | 0 | 15 | 15 |
| Jaguar MDD solution[1], gm. | 0 | 0 | 0 | 0 | 15 | 15 | 15 | 15 |

[1] An aqueous solution of Jaguar MDD, a natural hydrophilic colloid made from refined guar gum sold by Stein Hall & Company, New York, New York, containing 1 gram of Jaguar MDD per liter of water.

Figure 2:
FIGURE 2 is a photomicrograph of sodium carbonate monohydrate crystals produced from an aqueous solution of sodium carbonate containing no additives.

FIGURE 2 shows crystals prepared without any additives from Run 1.

Figure 3:
FIGURE 3 is a photomicrograph of sodium carbonate monohydrate crystals produced from an aqueous solution of sodium carbonate containing small amounts of sodium metasilicate.

FIGURE 3 shows crystals prepared in the presence of sodium metasilicate only from Run 2.

Figure 4:
FIGURE 4 is a photomicrograph of sodium carbonate monohydrate crystals produced from an aqueous solution of sodium carbonate containing a small amount of sodium sulfate.

FIGURE 4 shows crystals prepared in the presence of sodium sulfate only from Run 3.

Figure 5:
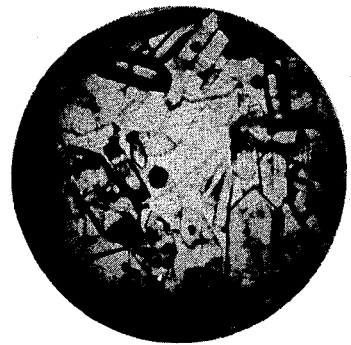
FIGURE 5 is a photomicrograph of sodium carbonate monohydrate crystals produced from an aqueous solution of sodium carbonate containing small amounts of sodium sulfate and sodium metasilicate.

FIGURE 5 shows crystals prepared in the presence of sodium sulfate and sodium metasilicate from Run 4.

Figure 6:
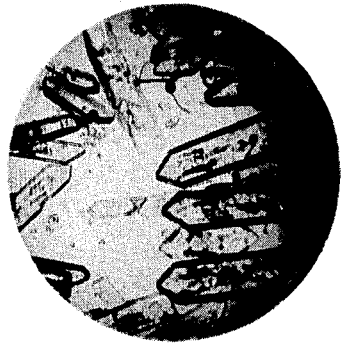
FIGURE 6 is a photomicrograph of sodium carbonate monohydrate crystals produced from an aqueous solution of sodium carbonate containing a small amount of a water-soluble carbohydrate gum.

FIGURE 6 shows crystals prepared in the presence of guar gum only from Run 5.

Figure 7:
FIGURE 7 is a photomicrograph of sodium carbonate monohydrate crystals produced from an aqueous solution of sodium carbonate containing small amounts of sodium sulfate and a water-soluble carbohydrate gum.

FIGURE 7 shows crystals prepared in the presence of guar gum and sodium sulfate from Run 6.

Figure 8:
FIGURE 8 is a photomicrograph of sodium carbonate monohydrate crystals produced from an aqueous solution of sodium carbonate containing small amounts of sodium metasilicate and a water-soluble carbohydrate gum.

FIGURE 8 shows crystals prepared in the presence of guar gum and sodium metasilicate from Run 7.

Figure 9:
FIGURE 9 is a photomicrograph of sodium carbonate monohydrate crystals produced from an aqueous solution of sodium carbonate containing small amounts of sodium metasilicate, sodium sulfate and a water-soluble carbohydrate gum.

FIGURE 9 shows crystals in the presence of guar gum, sodium sulfate and sodium metasilicate from Run 8.

These illustrations disclose the marked difference in the shape of sodium carbonate monohydrate crystals when they are crystallized in the presence of silicate and sulfate ions and a carbohydrate gum. As can be seen, the crystals are predominantly in the form of thin plates unless all three are present. It should be noted that, when the crystals are formed in the presence of only one of these constituents, the crystals are even more predominantly in the shape of hexagonal plates than without any additives thereby further illustrating the synergistic effect of the combination of all three constituents. The crystals illustrated by FIGURE 9, prepared in accordance with this invention, are predominantly in compact, granular form with fewer sharper edges and points and have a low surface to volume ratio

I claim:
1. A method for producing sodium carbonate monohydrate crystals having a compact, granular form from an aqueous solution of sodium carbonate comprising evaporating a portion of the water from said solution in the presence of small amounts of soluble silicate ions in the form of sodium silicate, soluble sulfate ions in the form of sodium sulfate, and a water-soluble carbohydrate gum.

2. The method according to claim 1 wherein said water-soluble carbohydrate gum is a glactomannan.

3. The method according to claim 2 wherein said glactomannan is a guar gum.

4. The method according to claim 1 wherein the concentration of said silicate ions calculated as sodium silicate, said sulfate ions calculated as sodium sulfate, and said carbohydrate gum are in the range of 0.4 to 6.5 weight percent, 0.4 to 4.5 weight percent, and 5 to 25 parts per million, respectively.

5. The method according to claim 4 wherein the concentration of said silicate ions is about 4.5 weight percent, the concentration of said sulfate ions is about 4.5 weight percent, and the concentration of said carbohydrate gum is about 10 parts per million.

6. In a process for producing dense soda ash from crude trona ore which comprises calcining the crude trona ore, dissolving the calcined trona to form a trona solution, separating insoluble materials from said trona solution, crystallizing sodium carbonate monohydrate from said trona solution and drying said crystals to form a dense soda ash product, the improvement comprising maintaining the silicate ion concentration calculated as sodium silicate and the sulfate ion concentration calculated as sodium sulfate in the trona solution being introduced into said crystallizing step in the range of 0.4 to 6.5 weight percent and 0.4 to 4.5 weight percent, respectively, and performing said crystallization in the presence of 5 to 25 parts per million of a water-soluble carbohydrate gum, based on the total weight of said solution, so as to form compact, granular sodium carbonate monohydrate crystals.

7. A process according to claim 6 wherein the concentration of said silicate ion, sulfate ion and carbohydrate gum is about 4.5 weight percent, about 4.5 weight percent, and about 10 parts per million, respectively.

8. A process according to claim 6 wherein said water-soluble carbohydrate gum is a glactomannan.

9. The process according to claim 8 wherein said glactomannan is guar gum.

10. The process according to claim 9 wherein the concentration of said silicate ion, sulfate ion and guar gum is about 4.5 weight percent, about 4.5 weight percent, and about 10 parts per million, respectively.

References Cited

UNITED STATES PATENTS

| | | | |
|---|---|---|---|
| 2,670,269 | 2/1954 | Rahn | 23—63 |
| 2,962,348 | 11/1960 | Seglin et al. | 23—63 X |
| 3,037,849 | 6/1962 | Frint et al. | 23—300 |
| 3,084,026 | 4/1963 | Frint et al. | 23—63 X |
| 3,260,567 | 7/1966 | Hellmers et al. | 23—63 |

OSCAR R. VERTIZ, Primary Examiner

G. T. OZAKI, Assistant Examiner

U.S. Cl. X.R.

23—302